United States Patent [19]

Mailliet et al.

[11] 4,190,074

[45] Feb. 26, 1980

[54] PRESSURE EQUALIZATION VALVE AND TECHNIQUE FOR SHAFT FURNACE

[75] Inventors: Pierre H. Mailliet, Howald; Michel Kirchen, Luxembourg, both of Luxembourg

[73] Assignee: Paul Wurth, S.A., Luxembourg

[21] Appl. No.: 814,105

[22] Filed: Jul. 8, 1977

[30] Foreign Application Priority Data

Jul. 13, 1976 [LU] Luxembourg ............................ 75372

[51] Int. Cl.² ...................... F16K 43/00; F16K 31/12
[52] U.S. Cl. ...................................... 137/315; 251/58;
251/298; 251/361
[58] Field of Search ................... 137/315; 251/58, 228,
251/298, 361

[56] References Cited

U.S. PATENT DOCUMENTS

| 612,627 | 10/1898 | Hirt | 251/58 |
|---|---|---|---|
| 1,899,154 | 2/1933 | Karrick | 251/361 |
| 1,980,495 | 11/1934 | Muir | 251/298 |
| 2,019,502 | 11/1935 | Osgood | 251/58 |
| 3,037,737 | 6/1962 | Könemund et al. | 251/58 |
| 3,074,427 | 1/1963 | Wheeler, Jr. | 137/315 |
| 3,554,216 | 1/1971 | Piguet | 137/315 |
| 3,589,670 | 6/1971 | Armstrong | 251/58 |
| 3,647,182 | 3/1972 | Boudot et al. | 251/361 |
| 3,727,880 | 4/1973 | Stock | 251/58 |

FOREIGN PATENT DOCUMENTS

| 70025 | 2/1959 | France | 251/298 |
|---|---|---|---|
| 1211088 | 3/1960 | France | 251/228 |

*Primary Examiner*—Martin P. Schwadron
*Assistant Examiner*—G. L. Walton

[57] ABSTRACT

A valve suitable for use in equalizing the pressure in chambers of a blast furnace charging installation includes a seat member which may be removed for servicing through translatory movement perpendicular to the valve flow axis. The valve is also characterized by a valve member mounted on a pivotal arm in such a manner that articulation of the valve member with respect to the end of the pivot arm is permitted.

12 Claims, 10 Drawing Figures

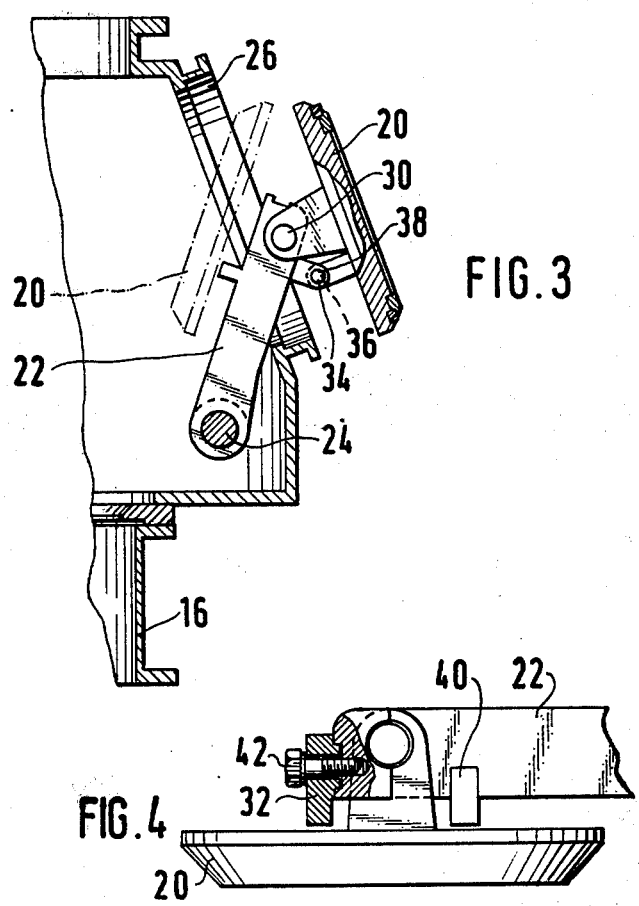
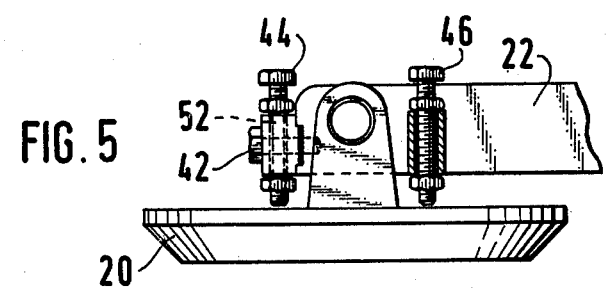

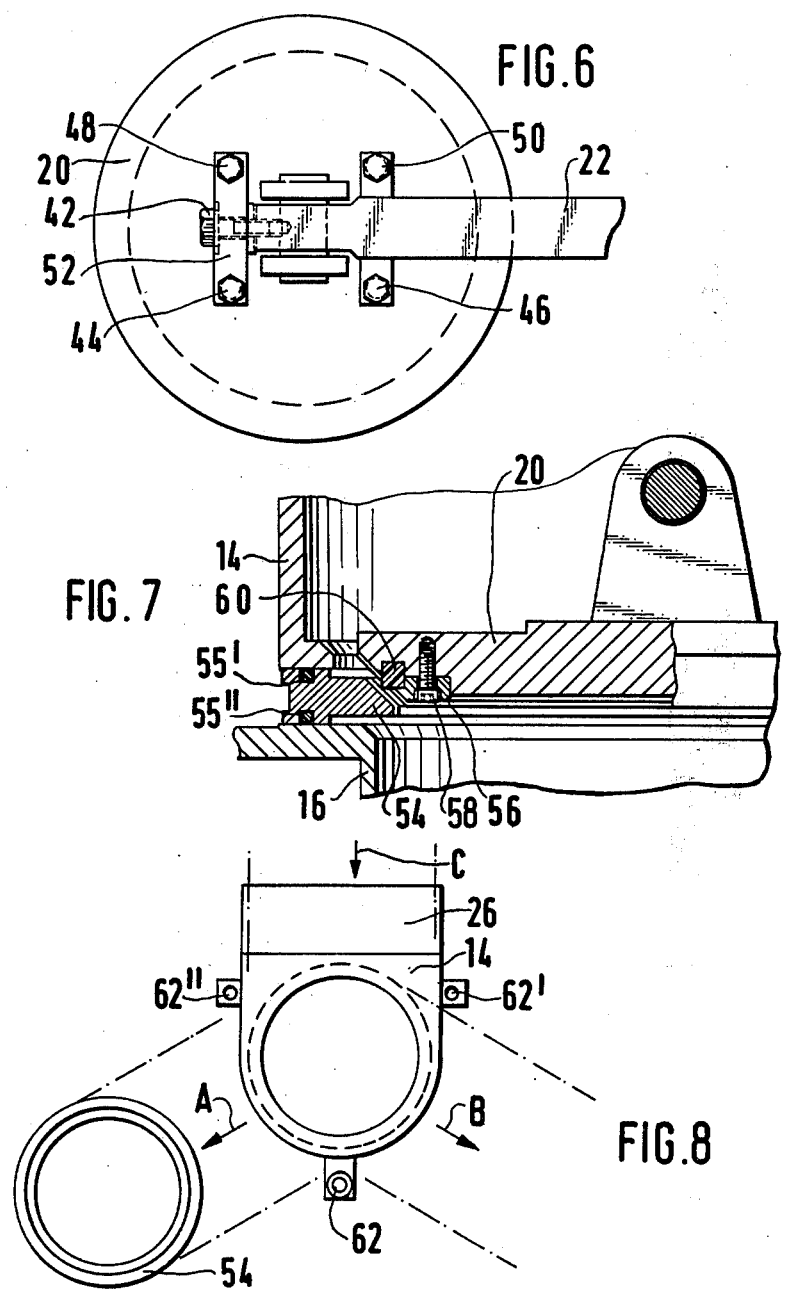

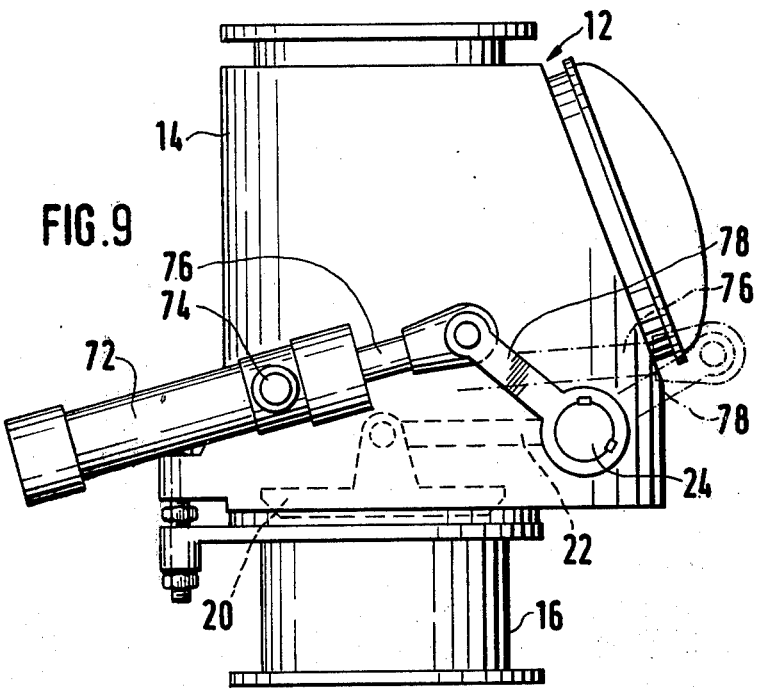
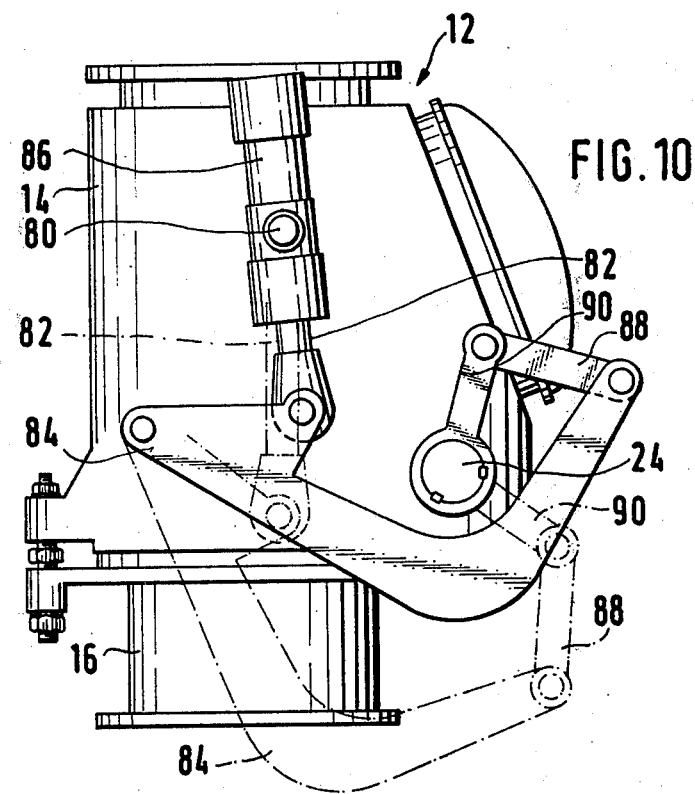

PRESSURE EQUALIZATION VALVE AND TECHNIQUE FOR SHAFT FURNACE

BACKGROUND OF THE INVENTION (1) Field of the Invention

The present invention relates to the alternate pressurization and depressurization of a chamber, for example an intermediate storage hopper which forms part of a blast furnace charging installation, and particularly to enhancing the service life of apparatus employed in such pressurization and depressurization. More specifically, this invention is directed to values which are peculiarly well suited to use in pressure equalization or isolation systems. Accordingly, the general objects of the present invention are to provide novel and improved methods and apparatus of such character.

(2) Description of the Prior Art

While not limited thereto in its utility, the present invention is particularly well suited for use in equipment ancillary to blast furnaces of the type which operate with high counter-pressures in the region of the furnace throat. In order to maximize the efficiency of operation, such furnaces are provided with pressure equalization chambers, for example in the form of intermediate charge storage hoppers, which enable the furnace to be charged while in operation without undergoing any appreciable pressure losses. Such chambers must be equipped with pressure equalization valves whereby they may be alternately supplied with ambient air and subjected to pressure. An example of a pressure equalization valve suitable for use with blast furnaces may be found in copending U.S. patent application Ser. No. 770,193, now U.S. Pat. No. 4,162,784, which is assigned to the assignee of the present invention; U.S. application Ser. No. 770,193, now U.S. Pat. No. 4,162,784, corresponding to Luxembourg Pat. No. 74,505. Reference may also be had to U.S. Pat. No. 3,693,812 for a disclosure of a furnace charging installation including two intermediate storage hoppers which are alternately isolated from the pressure conditions prevailing within the furnace and the ambient atmosphere by pressure equalization valves.

The valve described in copending application Ser. No. 770,193, now U.S. Pat. No. 4,162,784, particularly with respect to FIG. 2 thereof, comprises a mushroom-shaped sliding closure device, hereinafter referred to as the valve member, which is raised from its seat in order to give passage to the gas under pressure. The valve member remains in the gas stream when the valve is in the open condition and is therefor exposed to the erosion and corrosive effects of materials entrained by the gases passing through the valve. Accordingly, both the valve member and the valve seat of the valve of copending application Ser. No. 770,193, now U.S. Pat. No. 4,162,784, experience comparatively rapid wear and therefor have to be replaced or repaired on a relatively frequent basis. Also, by reason of its design, the valve of the copending application has to be installed in a curved section of the conduit through which the gas is passing and the problems associated with wear of the seat and valve member are thus intensified. The major disadvantage associated with wear of the valve components resides in the considerable time consumed by the operation of replacing the seat and valve member since such maintenance operation requires a lengthy stoppage of the furnace. The time consumed by the service procedure is, in part, a result of the fact that the conduit in which the valve is installed and/or the valve itself has to be dismantled in order to give access to the valve seat and the valve member.

Continuing with a discussion of the environment of a shaft furnace, various types of valves have been proposed wherein the valve member is pivotally mounted so as to be capable of movement out of the gas stream when the valve is in the open condition. While valves which employ pivotal valve members are characterized by reduced wear when compared to valves of the type shown in application Ser. No. 770,193 now U.S. Pat. No. 4,162,784, particularly on the sealing surfaces of the valve member, they nevertheless suffer from the drawback that replacement of the valve seat requires a lengthy furnace shut-down incident to the dismantling of the conduit in which the valve is installed. It may be noted, however, that access to the valve member is somewhat easier in those pressure equalization valves wherein the valve member is mounted on a pivoting support arm since it is possible to move the arm to a position where the valve member will extend through a lateral aperture in the conduit. Obviously, if access to the valve member is to be provided in this manner, the amplitude of the pivoting movement must be fully adequate. This, however, involves a further drawback inasmuch as the amplitude of displacement of the piston of the hydraulic jack, which is the customary means of actuating the valve, must be quite large thus requiring a correspondingly high consumption of hydraulic fluid. An isolation valve wherein the valve member is mounted on a pivotal arm and actuated by means of a hydraulic jack is shown in copending application Ser. No. 737,173, now U.S. Pat. No. 4,144,902; this copending application also being assigned to the assignee of the present invention.

SUMMARY OF THE INVENTION

The present invention overcomes the above-briefly discussed and other deficiencies and disadvantages of the prior art by providing a novel and improved pressure equalization valve and a technique for the operation thereof which facilitates any necessary servicing thereof. While overcoming the deficiencies of the prior art, the present invention nevertheless retains all of the advantages thereof.

In accordance with the present invention a pressure equalization valve, for installation in a conduit having a longitudinal axis, is characterized by a valve seat supporting member which may be removed for servicing by means of a translatory movement perpendicular to the longitudinal axis of the valve housing and without dismantling any of the remaining components of the valve. A pressure equalization valve in accordance with a preferred embodiment of the present invention is further characterized by a valve member mounted on a pivotal arm in such a manner that articulation of the valve member with respect to the end of the pivot arm is permitted.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 3 is a partial cross-sectional side elevation view which depicts the manner of servicing the valve element of the equalization valve of FIGS. 1 and 2;

FIG. 4 is an enlarged view, partly in section, showing a first technique for mounting the valve element of the embodiment of FIGS. 1 and 2 on the pivot arm;

FIG. 5 is an enlarged view, partly in section, depicting a second technique for mounting the valve element of the equalization valve of FIGS. 1 and 2 on the pivot arm;

FIG. 6 is a top plan view of the apparatus of FIG. 5;

FIG. 7 is a partial cross-sectional side elevation view, on an enlarged scale, showing the sealing surfaces of the equalization valve of FIGS. 1 and 2;

FIG. 8 is a schematic diagram showing the servicing technique for the valve seat of the equalization valve of FIGS. 1 and 2;

FIG. 9 is a partially schematic side elevation view depicting a first embodiment of an actuator for the equalization valve of FIGS. 1 and 2; and FIG. 10 is a view, similar to FIG. 9, depicting a second embodiment of a valve actuator in accordance with the invention.

DESCRIPTION OF THE PREFERRED EMBODIMENTS

Figure 1:
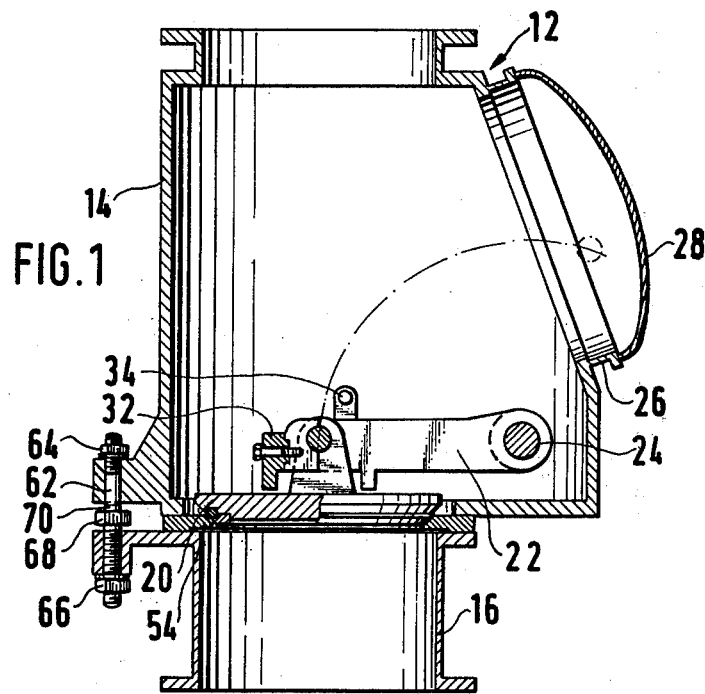
FIG. 1 is a cross-sectional side elevation view of a pressure equalization valve, shown in the closed position, in accordance with a first embodiment of the invention.
Figure 2:
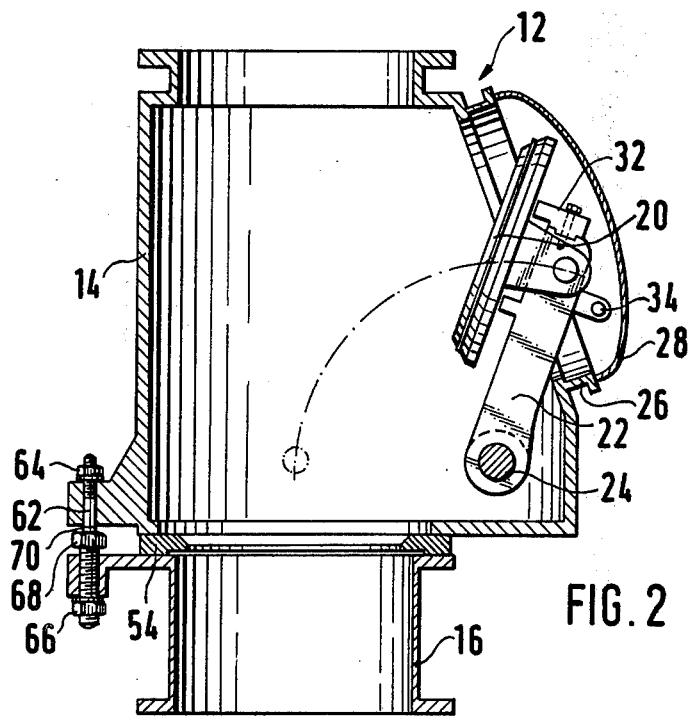
FIG. 2 is a cross-sectional, side elevation view showing the valve of FIG. 1 in the open position.

Referring jointly to FIGS. 1 and 2, a pressure equalization valve in accordance with a preferred embodiment of the invention is indicated generally at 12. Valve 12 may, for example, be employed to enable a pressure equalization chamber of a shaft furnace to be subjected to pressure or supplied with ambient air. Valve 12 includes a housing or casing 14 which will be incorporated in a conduit, not shown, in the conventional manner. A conduit section 16 forms a part of valve 12 and constitutes an extension of the flow path defined by housing 14. If deemed necessary or desirable, conduit section 16 may be provided with a fitting consisting of perforated plates which serve to reduce the velocity of gases passing through the valve to thereby reduce both wear of valve components and noise. Such a perforated plate assembly is described in copending application Ser. No. 770,193.

The closure member for valve 12 comprises a clack or valve member 20. Valve member 20 is mounted on a pivot arm 22 adjacent the first or free end thereof. Arm 22 is pivotable about an axis defined by a rotatable pivot shaft 24 which extends out of casing 14. The valve member 20 will be actuated between the closed position of FIG. 1 and the open position of FIG. 2 by means of a driving device, not shown in FIGS. 1 and 2, which will typically take the form of a hydraulic jack.

Valve housing 14 is provided with a lateral aperture or opening 26 which is normally covered, so as to be hermetically sealed, by means of a cover member 28. Cover member 28 is removable to permit inspection and, if necessary, removal and repair or replacement of valve member 20. As will be described below in the discussion of FIGS. 4 through 6, valve member 20 is articulated on pivot arm 22 and, as may be seen from FIG. 3, one of the attributes of the present invention is the ability to rotate the valve member about the end of arm 22. Thus, servicing of the valve member of a pressure equalization valve in accordance with the present invention is facilitated by rotating the valve member 20 about an articulation axis 30 (FIG. 3) between arm 22 and valve member 20. As depicted in FIG. 3, this permits the valve member 20 to be moved to the outside of housing 14 without the necessity of the arm 22 being actuated beyond the normal open position as shown in FIG. 2.

Continuing to refer to FIGS. 1-3, rotation of valve member 20 from the position shown in FIG. 2 to that of FIG. 3 is permitted by removal of a positioning foot 32 affixed to the free end of arm 22. Once foot 32 has been removed, presuming the cover 28 has also been removed, the valve member 20 can be manually tilted into the position shown in FIG. 3. In order to maintain the valve member in the service position of FIG. 3, arm 22 and valve member 20 are respectively provided with apertured arms 34 and 36 and a rod 38 may be inserted through the apertures in the ends of arms 34 and 36 when they are brought into alignment.

The rotation of the valve member 20 about the end of pivot arm 22 may also be achieved through the use of an articulation system installed between the arm and valve member. Alternatively, it is possible to mount valve member 20 by means of devices known as sash gates over three-lever valves. If mounted on this principle, the valve member 20 will be automatically turned back about the end of arm 22 during the opening action and the sealing surfaces of the valve member would then always face toward the outside when the valve is in the open position thus eliminating the manual turning operation and insuring that the sealing surfaces of the valve member would always face away from the flow of gases.

Referring to FIG. 4, it may be seen that clearance will be provided between arm 22 and valve member 20 in order to insure that the sealing surface of the valve member will seat on the stationary valve seat in the most satisfactory possible manner. The amplitude of this clearance is controlled by means of positioning feet 32 and 40; foot 32 being removable as previously discussed by means of bolt 42 in order to release the valve member 20 as shown in FIG. 3.

FIGS. 5 and 6 show a modified system wherein the clearance between the valve member 20 and pivot arm 22 is adjustable. In the embodiment of FIGS. 5 and 6 the clearance is determined by means of four regulating screws 44, 46, 48 and 50. Each of the four regulating screws is provided with a nut and a lock nut. Regulating screws 44 and 48 pass through a cross-piece 52 which can be removed by releasing screw 42 to permit the rotation of valve member 20 about the end of arm 22.

Considering now FIG. 7, the cooperating surfaces between the stationary valve seat and the valve member 20 are shown on an enlarged scale. The valve member 20 is provided with a metal sealing member 56, which may be removed through the loosening of a plurality of screws 58, and a resilient insert 60 which may, for example, be comprised of neoprene or silicon. The stationary valve seat 54 consists of an annular element which is clamped between the facing ends of housing 14 and conduit section 16. Leakage between the interior and exterior of the valve housing about seat member 54 is prevented through the use of toroidal joints; i.e., O-ring type seals; 55' and 55" which are mounted on the opposite side surfaces of seat member 54. Referring to FIG. 8, the clamping of the valve member 54 between housing 14 and conduit section 16 is effected with the aid of three bolts 60, 62' and 62"; one of such bolts 62 also being shown in FIGS. 1 and 2. Referring to FIG. 1, a pair of outer nuts 64 and 66 secure the assembly while an intermediate nut 68 aids in defining the separation, as required for valve seat 54, between bolt receiving flanges on housing 14 and conduit section 16. The requisite separation can be effected by means of a shoulder 70 on bolt 62; shoulder 70 forming a transition between two portions of the bolt which differ in diameter.

To release the valve seat, the bolts 62 are loosened by slackening the lower nuts 66 and moving the intermediate nuts 68 away from the shoulders 70. The nuts 68 and the shoulders 70, by respectively bearing against the flanges on conduit section 16 and against the flanges on housing 14, move the housing and conduit section apart thus enabling seat member 54 to be removed by means of a translatory movement as represented in FIG. 8. While FIG. 8 shows valve member 54 moved in the direction of arrow A, obviously it is also possible to move the seat in the direction of either of arrows B or C depending upon the accessibility from either of these three directions. At least two of the clamping bolts 62 must be separated by a distance which exceeds the outer diameter of seat member 54.

It will be understood that various alternative methods for releasably clamping seat member 54 between housing 14 and conduit section 16 may be adopted. The important feature of the present invention is that the valve seat securing member may be released in a short time to permit the valve seat to be removed in a direction which is transverse to the axis of the flow path through the valve.

A pressure equalization valve in accordance with the present invention, like the valves of the prior art, is preferably actuated by means of a hydraulic jack. FIG. 9 illustrates a conventional construction wherein the jack 72 is mounted for rotation about a pivot 74. When the piston rod 76 of jack 72 is extended from the position shown in solid lines to that shown in broken lines, this movement is transmitted via an arm 78 to rotatable shaft 24 and thus to the valve member via its pivot arm; the broken line position of FIG. 9 corresponding to the open position of the valve. In the embodiment of FIG. 9 the amount of movement which must be imparted to piston rod 76 in order to fully open the valve is comparatively long and thus involves a somewhat high consumption of hydraulic fluid. It should be noted, however, that the distance between the valve open and valve closed positions occupied by the end of piston rod 76 in FIG. 9 corresponds to the maximum amplitude of displacement for valve member 20. In the prior art, if servicing of the valve member through the lateral aperture 26 in the housing was desired, it was necessary to further extend the piston rod 76 with respect to the open position of the valve so as to permit the valve member to be extended outwardly through opening 26. The present invention renders this further extension of the piston rod of the hydraulic jack actuator unnecessary and also simplifies the construction of the actuator system since no intermediate stop positions are required.

FIG. 10 shows a further embodiment of a technique for actuating a pressure equalization valve member in accordance with the present invention. In accordance with FIG. 10 a hydraulic jack 86 is mounted on a pivot 80 and actuates, via its piston rod 82, a lever 84. Lever 84 pivots about an axis parallel to the shaft 24 about which the valve member pivots. The first end of lever 84 and the end of an arm 90, which is rigidly affixed to and extends from shaft 24, are interconnected by means of a connecting rod 88. The positions shown in full lines and in broken lines for piston rod 82, lever 84, connecting rod 88 and arm 90 in FIG. 10 respectively represent the closed and open positions of the valve member. Lever 84 may be selected to obtain a desired ratio between the amplitude of the displacement of piston rod 82 and the amplitude of the rotation of shaft 24, taking into account the transmission ratio for the forces involved, to minimize the hydraulic fluid requirements for jack 86. Comparing the embodiments of FIGS. 9 and 10, the amplitude of the displacement which must be imparted to piston rod 82 in the FIG. 10 embodiment is relatively moderate relative to that required in FIG. 9 for a given angle of rotation of shaft 24. Accordingly, employment of the apparatus and technique of FIG. 10 permits use of a small hydraulic jack which is characterized by a relatively low rate of hydraulic fluid consumption.

The pressure exerted on the valve member when in the closed position depends on the angle between the lever 84 and the connecting rod 88. The smaller this angle, the greater will be the pressure. As may be seen from FIG. 10, the angle between connecting rod 80 and lever 84 decreases as the valve member is closed and the force transmission ratio will accordingly be at its maximum when the valve is in the closed position. This constitutes an additional advantage to the FIG. 10 embodiment since a hydraulic jack of relatively moderate power will suffice to enable a fairly high pressure to be exerted on the valve member in order to keep it closed.

It is possible to employ a hydro-elastic type actuator with the present invention whereby the valve will be capable of opening automatically in the event of an occurrence of an abnormal gas pressure in the conduit downstream of the valve. Obviously, this additional safety feature is only desired when the valve member is closed in opposition to the gas pressure.

One of the important advantages of the valve system and technique of the present invention resides in the ability to replace worn components promptly and without any prolonged stoppage of the furnace. As noted above, the valve seat may be dismantled merely by releasing the three clamping screws and moving the seat in a direction transverse to the valve flow axis. Similarly, the performance of service on the valve member is facilitated since it will either be manually or automatically tilted so as to present its sealing surfaces to the lateral opening in the valve housing. An additional advantage of the present invention resides in the fact that, when in the open position, the valve member does not obstruct the passage of gases which may therefore follow a straight trajectory rather than being directed through an elbow or bend in the conduit. This feature greatly reduces the wear suffered by the valve member and also prevents the valve member from impeding the movement of the gases or reducing their flow rate.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A pressure equalization valve comprising:
    valve body means, said body means being adapted for connection between a pair of spacially displaced conduits, said body means defining a fluid flow path having an axis, said valve body means having end portions circumscribing said flow path, said body means being provided with a lateral opening at one side thereof;

removable cover means for said body means lateral opening;

a conduit section, said conduit section having an axis aligned with the fluid flow path axis of said valve body means, said conduit section having end portions circumscribing said flow path, said conduit section being displaced from said body means along said aligned axes;

valve seat means, said valve seat means being transversely movable with respect to said aligned axes and having a generally annular shape, said valve seat means being positioned between said body means and said conduit section and in contact with facing end portions thereof when in the installed state, said seat means defining a valve seat having an aperture axially aligned with said fluid flow path;

means for clamping said seat means between said body means and said conduit section facing end portions, said clamping means interconnecting said valve body means and said conduit section, said seat means being removable from said valve in a direction transverse to said fluid flow path axis upon loosening of said clamp means without interruption of the connection between and the axial alignment of said body means and said conduit section, said clamp means when in the tightened condition causing establishment of a hermetic seal between each of said body means and said conduit section and said seat means, said clamp means further including means for urging said body means and conduit section apart in the axial direction upon the loosening of said clamp means;

a rotatable control shaft, said control shaft passing through said body means;

means for imparting rotary motion to said control shaft;

a valve member disposed within said body means, said valve member having a sealing surface which cooperates with the seat defined by said seat means to perform a valving function;

pivot arm means, said pivot arm means being connected adjacent a first end thereof to said rotatable control shaft; and means coupling said valve member to said pivot arm means adjacent the second end thereof whereby rotation of the control shaft will result in said valve member moving between a closed position wherein said sealing surface is in contact with said valve seat and an open position wherein said valve member is disposed adjacent to said body means lateral opening, said coupling means permitting articulation of said valve member with respect to the second end of said pivot arm means.

2. The apparatus of claim 1 wherein said clamp means comprises:

a plurality of removable securing devices positioned about the periphery of said valve body means and conduit section, at least two of said securing devices being spaced by a distance at least equal to the external diameter of said annular seat means.

3. The apparatus of claim 1 wherein said coupling means comprises:

a pivot connection between said valve member and said pivot arm means, said pivot connection permitting rotation of said valve member through an angle of at least 180° whereby the sealing surface of said valve member may be caused to face said lateral aperture.

4. The apparatus of claim 2 wherein said coupling means comprises:

a pivot connection between said valve member and said pivot arm means, said pivot connection permitting rotation of said valve member through an angle of at least 180°.

5. The apparatus of claim 4 wherein said means for imparting motion to said control shaft comprises:

a hydraulic jack positioned externally of said valve body means;

a pivotal lever;

connecting rod means joining a first end of said pivotal lever to said rotatable control shaft; and means connecting said hydraulic jack to said pivotal lever adjacent the second end thereof.

6. The apparatus of claim 1 wherein said means for imparting motion to said control shaft comprises:

a hydraulic jack positioned externally of said valve body means;

a pivotal lever;

connecting rod means joining a first end of said pivotal lever to said rotatable control shaft; and means connecting said hydraulic jack to said pivotal lever adjacent the second end thereof.

7. The apparatus of claim 1 further comprising:

means for limiting the clearance between said valve member and said pivot arm means, at least some of said clearance limiting means being removable to permit rotation of said valve member about the second end of said pivot arm means.

8. The apparatus of claim 7 wherein said clamp means comprises:

a plurality of removable securing devices positioned about the periphery of said valve body means and conduit section, at least two of said securing devices being spaced by a distance at least equal to the external diameter of said annular seat means.

9. The apparatus of claim 8 wherein said clearance limiting means are adjustable.

10. A pressure equalization valve comprising:

valve body means, said body means being adapted for connection between a pair of spacially displaced conduits, said body means defining a fluid flow path having an axis, said valve body means having end portions circumscribing said flow path, said body means being provided with a lateral opening at one side thereof;

removable cover means for said body means lateral opening;

a conduit section, said conduit section having an axis aligned with the fluid flow path axis of said valve body means, said conduit section having end portions circumscribing said flow path;

valve seat means, said valve seat means being transversely movable with respect to said aligned axes and having a generally annular shape, said valve seat means being positioned between said valve body means and said conduit section and in contact with facing end portions thereof when in the installed state, said seat means defining a valve seat having an aperture axially aligned with said fluid flow path;

means for clamping said seat means between said body means and said conduit section facing end portions, said seat means being removable from the valve in a direction transverse to said fluid flow path axis upon loosening of said clamping means, said clamping means when in the tightened condition causing establishment of a hermetic seal between each of said body means and said conduit section and said seat means;

a rotatable control shaft, said control shaft passing through said body means;

means for imparting rotary motion to said control shaft;

a valve member disposed within said body means, said valve member having a sealing surface which cooperates with the seat defined by said seat means to perform a valving function;

pivot arm means, said pivot arm means being connected adjacent a first end thereof to said rotatable control shaft;

a pivot connection coupling said valve member to said pivot arm means adjacent the second end thereof, rotation of the control shaft causing said valve member to move between a closed position wherein said sealing surface is in contact with said valve seat and an open position wherein said valve member is disposed adjacent to said body means lateral opening, said pivot connection permitting rotation of said valve member through an angle of at least 180° whereby the sealing surface of said valve member may be caused to face said lateral opening; and means for limiting the clearance between said valve member and said pivot arm means, at least some of said clearance limiting means being removable to permit rotation of said valve member about the second end of said pivot arm means.

11. The apparatus of claim 10 wherein said clearance limiting means are adjustable.

12. The apparatus of claim 11 wherein said means for imparting motion to said control shaft comprises:

a hydraulic jack positioned externally of said valve body means;

a pivotal lever;

connecting rod means joining a first end of said pivotal lever to said rotatable control shaft; and means connecting said hydraulic jack to said pivotal lever adjacent the second end thereof.

* * * * *